(12) United States Patent        (10) Patent No.:     US 8,856,058 B1
Martin et al.                    (45) Date of Patent:        Oct. 7, 2014

(54) BUSINESS RULES ENGINE WITH DYNAMICALLY ADDRESSABLE FACTS

(75) Inventors: David Brooke Martin, San Jose, CA (US); Arkadiy Isaakovich Reznik, Phoenix, AZ (US)

(73) Assignee: NICE Systems Technologies Inc., Richardson, TX (US)

( * ) Notice: Subject to any disclaimer, the term of this patent is extended or adjusted under 35 U.S.C. 154(b) by 213 days.

(21) Appl. No.: 13/343,611

(22) Filed: Jan. 4, 2012

(51) Int. Cl.
  *G06F 17/00* (2006.01)
  *G06N 5/02* (2006.01)

(52) U.S. Cl.
  USPC .......................................................... 706/47

(58) Field of Classification Search
  None
  See application file for complete search history.

(56) References Cited

U.S. PATENT DOCUMENTS

| | | | |
|---|---|---|---|
| 2007/0094199 A1* | 4/2007 | Deshpande et al. | 706/47 |
| 2010/0306262 A1* | 12/2010 | Kuo et al. | 707/776 |
| 2011/0055806 A1* | 3/2011 | Chicherin et al. | 717/106 |
| 2011/0099170 A1* | 4/2011 | Golani et al. | 707/737 |

\* cited by examiner

*Primary Examiner* — Kakali Chaki
*Assistant Examiner* — Kevin W Figueroa
(74) *Attorney, Agent, or Firm* — Pearl Cohen Zedek Latzer Baratz LLP

(57) ABSTRACT

A business rules engine includes dynamic objects to support dynamically addressable facts. The business rules engine is configured to reduce the need for developer resources to provision resources and adjust/adapt input data and output which would traditionally be required. As a result significant cost advantages are provided in the use of a business rules engine.

12 Claims, 2 Drawing Sheets

BUSINESS RULES ENGINE WITH DYNAMICALLY ADDRESSABLE FACTS

FIELD OF THE INVENTION

The present invention is generally related to an improved business rules engine.

BACKGROUND OF THE INVENTION

Business rules logic is an important part of many software systems. Typical solutions of how to implement and manage such rules fall into two categories, each of which has drawbacks.

A first category is home-grown rule definition and management—this can be done natively in the database (DB) using Structured Query Language (SQL), or written in a programming language (e.g. Java™). This has a number of drawbacks, including:

1. poor performance due to lack of rule optimization;
2. maintenance complexity from error-prone programming language syntax that does not naturally lend itself to rule development; and
3. a lack of agility for business users who must document rule change requirements and delegate the implementation to programmers, drastically extending the development cycle.

A second category includes rules engines. Conventional rules engines, although optimized for rule management and execution, also suffer from a lack of business agility. The inputs of rules engine processing can come from a variety of sources and the outputs are similarly variable. To manage input and output object models, a high level programming language is used. While business users might be able to manage the rules themselves, data model management remains a very complex technical undertaking and serious delays can be incurred when the input or output data needs to change.

While homegrown solutions and rules engines are commonly used to solve rule management challenges, neither is perfect. Both options have clear drawbacks in terms of performance, maintenance complexity, agility, or some combination of these factors. The best option is to use a rules engine, but the inherent complexity of managing input or output changes can be a serious roadblock.

A business rules engine is a software system that implements one or more business-related rules. A rule typically has a condition and an action and a business rule is a statement that defines or constrains some aspect of a business. The inputs to a rules engine include a collection of rules (often called a rule execution set) and data objects. The outputs are determined by the inputs and rules.

Rules engine provide a way to manage portions of business logic. There are a variety of rules engines in Java™ and other programming languages. Examples of rules engines include Drools, ILOG JRules, Jess, and others. There are also Java™ based APIs to access rules engines from Java™ platforms.

Using a rules engine in an application may require various initialization and maintenance steps to be performed, such as initializing the rules engine, instantiating working memory, reading rules from a file, adding facts from working memory, and instructing the rules engine to execute the rules. A rules engine wrapper may be used to initialize the rules engine, load the rules from a file system, and execute the rules. However, application classes have to insert facts into working memory and determine output formats, and this requires loading and execution of external resources.

One problem with conventional rules engines is that the conventional implementation paradigm requires considerable development resources to customize the rules engine to deal with input and output changes. As one example, input records may include unstructured or semi-structured data requiring custom code for even minor changes in input and output formulations. In a conventional implementation paradigm this requires significant development resources.

FIG. 1 illustrates some of the problems of using a conventional business rules engine to solve a business problem. As illustrated in FIG. 1, a conventional approach may involve interactions of a customer, a consultant, and a developer. As an illustrative example, seven or more steps may be required using a conventional business rules engine approach. First, in step 101 a customer defines a business need. A consultant then identifies the resources that are required in step 102. A developer then creates and compiles code to provision the new resources in step 103. The consultant then constructs rules to transform addressable resources in step 104. The developer then creates and compiles code to produce a final output in step 105. The consultant then presents the solution to the customer in step 106. The customer then decides to accept the solution in step 107.

The conventional process illustrated in FIG. 1 is slow and labor intensive and requires substantial engineering resources in steps 103 and 107. Consultants can't finish a solution without support from developers. Developers can't anticipate the needs of the consultant in advance of their problem. This creates a time consuming lock step for solving problems with the rules engine. For the consultant to address a new set of facts, a developer must write code to load the facts from a table into a new object because the database table cannot be loaded directly into the rules engine. Writing and compiling code is time consuming, error prone, and an ongoing maintenance cost. Additionally, to produce the final output, code must also be written appropriate to the rules transformation.

Note that in the example of FIG. 1 that there is inherently a lot of customization. However, the approach is also not agile in the sense of permitting easy change and adaptation if changes need to be made to the business rules and/or the data inputs and outputs.

Consider a business scenario where a rule needs to be created to check a variety of field values and trigger an event when those values match some condition. The input records will be obtained from a table called RECORD INPUT:

TABLE 1

Record Input Table
RECORD_INPUT

| ColName | Data Type |
| --- | --- |
| Key | VARCHAR2(255) |
| reason1 | VARCHAR2(255) |
| reason2 | VARCHAR2(255) |
| notesText | VARCHAR2(4000) |

In this example consider a Drools rules engines implementation of a rules engine which may, for example, be implemented on a server. Drools is a business logic integration platform that is an open source, forward chaining production rule system.

Drools is an object-oriented rules engine for Java™. In a Drools implementation the rules are grouped in rule sets, where a rule has a condition and an action. Drools Facts are Java™ beans instances. Drools provides logic (rules) and data (facts) separation that permits rules to be reused across applications.

A Drools engine includes a wrapper object that encapsulates the logic used to access Drools classes. The wrapper may, for example, initialize the rules engine, read rules from a file, add facts to working memory, and instruct the rules engine to execute the rules. The rules engine typically operates as part of a larger system (e.g., a BRMS) that includes a rules editor, rules compiler, runtime, and fact model.

Consider an example of a Drools implementation for a wrapper used to invoke the business rules engine that includes references to the input and output data as well as a rule file to process:

```
<msequence title="drools sequence"
   xmlns="http://www.mercedsystems.com/agatha">
   <drools comment="Business Rules">
      <table name="RECORD_INPUT" type="input"
class="com.merced.agatha.javaxform.drools. RecordInputLoader"/>
      <table name="RECORD_OUTPUT" type="output"
class="com.merced.agatha.javaxform.drools.RecordOutputPersister"/>
      <rules file="rules/Sample.drl"/>
      <parameter name="input.table"
value="RECORD_INPUT"/>
      <parameter name="output.table"
value="RECORD_OUTPUT"/>
   </drools>
</msequence>
```

In this example, the wrapper implements a "drools sequence" to implement a set of business rule for device troubleshooting. Table names for the record input and record output are defined. The record input table has a corresponding record input loader whereas the record output has a corresponding record output persister. Note that in the definition, loader and persister classes are hardcoded to compiled objects specific to a given input. The wrapper also includes a rules file, "rules/Sample.drl." However a disadvantage of this approach is that a separate Java class will usually have to be created and compiled for every input and output table before its information can be reasoned upon by the Drools business rules. This is because it is typically the case that two input tables do not share enough of their column names and types to be addressed by the same loader.

Below is a corresponding rules/Sample.drl file definition to implement a rule for device troubleshooting based on an if-then condition for the input records, including the hard-coded object references:

```
package callReasonRules;
import droolsCallReasons.InputRecord;
import droolsCallReasons.OutputRecord;
import droolsCallReasons.FactTransform;
global FactTransform transform;
rule "Device Troubleshooting"
when
   $record: InputRecord (
      reason1=="Troubleshooting"
      && reason2=="Device"
      && notesText not matches ".*broken.*"
   )
then
   insert(new OutputRecord($record.getKey( )
"Device", "Device Troubleshooting"));
end
rule "TaggedWriter"
when
   $outputRecord: OutputRecord ( )
then
   transform.persist($outputRecord);
   retract ($outputRecord);
end
```

The tagged records will be written to an output table called RECORD_OUTPUT:

TABLE 2

Record Output Table
RECORD_OUTPUT

| ColName | DataType |
|---|---|
| key | VARCHAR2(255) |
| Summary | VARCHAR2(255) |
| detail | VARCHAR2(255) |

What's important to note in this example is that both the input object InputRecord and the transformed result object TaggedRecord are defined in compiled code.

However, it's possible that business requirements will change to include new input variables for rule evaluation or include more detail in the output. When that happens, business users cannot immediately use the new inputs or outputs and are instead forced to wait for the technical group to change compiled code. Considering the strict software versioning of enterprise systems, rolling out even simple data model changes that require code modification can suddenly cause weeks or even months of delays.

SUMMARY OF THE INVENTION

An apparatus, system, method, and computer program product for generating and deploying rules in a rules engine is described using dynamically addressable facts to manage input or output changes. In a rules engine the inputs of rule engine processing can come from a variety of sources and the outputs are variable. By using dynamic object generation to support dynamic variations in the structure of facts, business users without coding experience or support can create and maintain rules, simplifying and increasing the velocity of rules-driven processes in the enterprise. Reducing the complexity and the number of resources involved also reduces the total cost of ownership for enterprise rules implementations.

DETAILED DESCRIPTION

The present invention is generally directed to an improve rules engine supporting dynamically addressable facts. Rules engines deal with facts. A fact is a unit of information with which a business rule can reason. For example, a database of cars may have a fact for each make and model of a vehicle. Facts can have attributes. In the case of the car example, a fact may have a color, year of manufacture, and model associated with it. Thus facts may correspond to records of a database table. Each row of the table is a fact, and each column an attribute of that fact. By improving the rules engine to have dynamically addressable facts the use of development resources is reduced, thereby providing a significant benefit in the use of a business rules engine.

Figure 1:
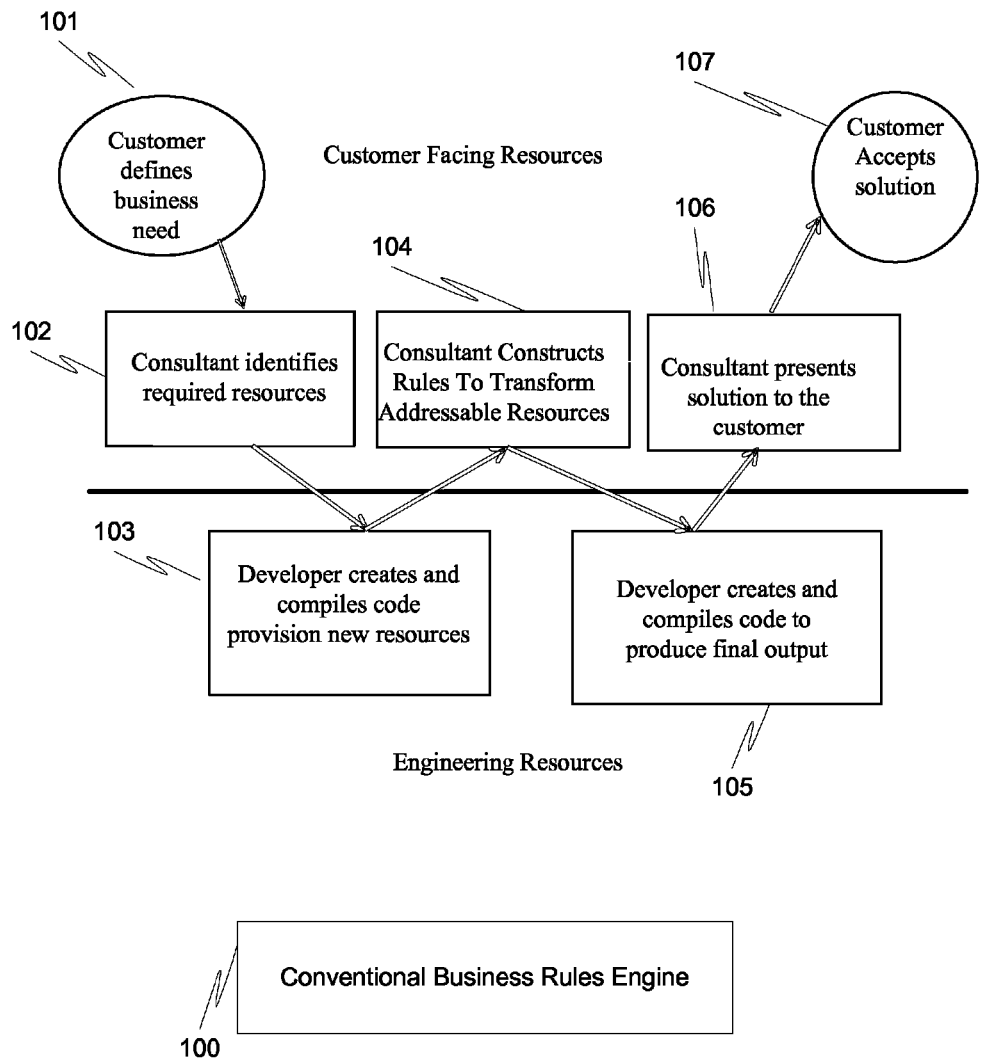
FIG. 1 illustrates a prior art business rules engine development cycle.
Figure 2:
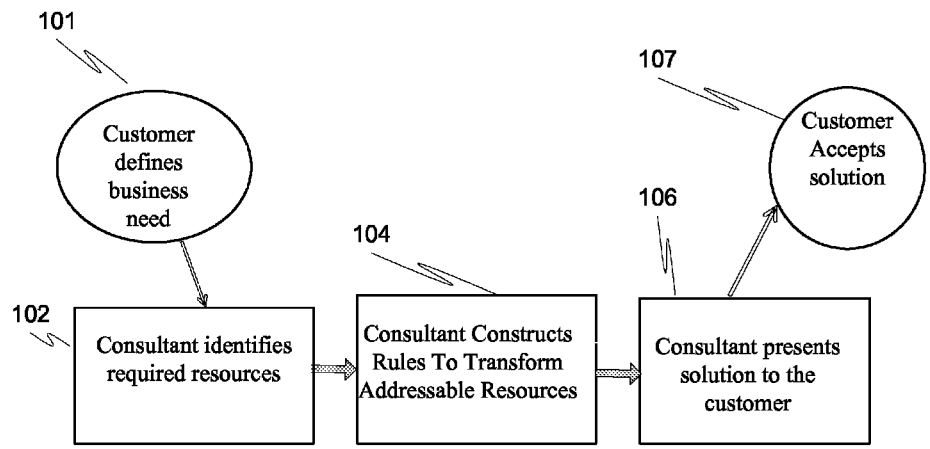
FIG. 2 illustrates a business rules engine development approach using dynamically generated objects in accordance with one embodiment of the present invention.
Figure 2:
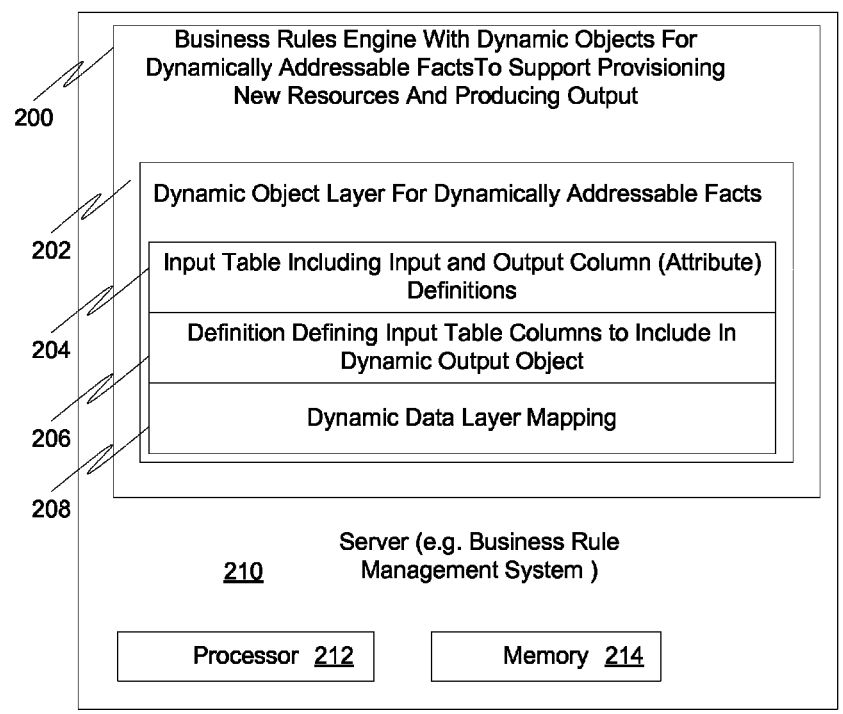

Referring to FIG. 2, the present invention is generally directed to the use of a business rules engine 200 supporting dynamically addressable facts to improve the work flow when using business rules. A customer defines a business need in step 101. A consultant identifies resources required in step 102. The consultant constructs rules to transform addressable resources in step 104. The consultant then presents the solution to the customer in step 106. The customer accepts the solution in step 107. However, the dynamically generated objects in the rules engine 200 handles the problem of provisioning new resources to produce a final output which in the prior art (FIG. 1 and tables 1-2) would require engineering resources to perform code customization and optimization. This permits customers and developers to make performance optimizations and rule optimizations in a convenient manner using a rules engine that include dynamically generated data objects.

As an illustrative example, in some applications the data resource is unstructured or semi-structured and varies from site-to-site. Additionally, variations in how the data is to be output may occur. Conventionally, in the prior art substantial developer resources would be required to provision new resources and adjust output details. In contrast, by using a robust rules engine with dynamically addressable facts the amount of engineering resources is reduced. Without developers involved, the consultant is free to address any input necessary. Fewer people are involved, less code needs to be produced and maintained, and the customers receive output that is the same or better than what would have been produced otherwise.

The present invention provides a new way of handling rule management that streamlines the business rule mapping process, allowing easy rule management while retaining the agility to dynamically handle data model changes. Fewer people are involved, less code needs to be produced and maintained, and the customers receive output that is the same or better than what would have been produced otherwise.

The present invention includes a robust rules engine to take advantage of performance optimizations and ease of rule maintenance while adding a dynamic object layer to support dynamically addressable facts. In one embodiment a dynamic object layer creates a layer of abstraction for business users and allows them to integrate input/output requirement changes without the need for technical expertise or changes to compiled code.

An exemplary implementation is based on the Drools rules engine. However, more generally it will be understood that the present invention is applicable to a variety of different proprietary and open source rules engines. Drools is an open sources rules engine which is written in Java™ and uses the Rete algorithm to evaluate rules written in a declarative way. Drools is also compliant with the Java™ Rules engine API JSR-94 standard. Rules are written in a Drools-specific syntax, and can be loaded from a variety of sources including text files with the conventional DRL suffix. Drools facts are expected to be Java™ beans instances, meaning that they have fields that are all accessible by appropriate getter and setter methods.

Referring to FIG. 2, an exemplary implementation using a dynamic object layer 202 in the rules engine 200 that supports the following functions to support dynamic addressing of facts:

1) The input table contains both input and output column (attribute) definitions, as indicated by sub-block 204 (the output columns are preferably null—they are used for a single purpose, which is to dynamically obtain output variable names);

2) In a rule block syntax, a parameter will define which of the input table's columns to include in the dynamic output object, as indicated by sub-block 206; and 3) A dynamic data layer mapping (sub-block 208) is supported that converts data from database records to first class object inputs, determines the output object fields and writes out the relevant transformed data.

Consider again an example in which the input object is a table named RECORD_INPUT but now employing the dynamic object layers, an example of which is provided below in Table 3. As with the prior art example our input will contain four columns: key, reason1, reason2, and notesText. By comparing Table 1 to Table 3 it can be observed that the RECORD_INPUT in Table 3 includes additional columns corresponding to the output columns in the RECORD_OUTPUT). In this example the desired output should have three columns: key, summary, and detail. That is, in order to manage these objects dynamically, the input table contains both the input and output column definitions. Output columns are just placeholders and can be NULL.

TABLE 3

Record Input Table
RECORD_INPUT

| ColName | Data Type |
|---|---|
| Key | VARCHAR2(255) |
| reason1 | VARCHAR2(255) |
| reason2 | VARCHAR2(255) |
| notesText | VARCHAR2(4000) |
| summary | VARCHAR2(255) |
| Detail | VARCHAR2(255) |

In this example, a Drools wrapper is used to invoke a business rules engine for call reasoning in a call center. The Drools wrapper will include references to persister and loader classes, input and output data, a rules file, and also further include output column parameters to define which of the input column to include in the dynamic output object:

```
<msequence title="drools sequence"
xmlns="http://www.mercedsystems.com/agatha">
    <drools comment="call reasoning">
        <table name="DROOLS_INPUT" type="input"
class="com.merced.agatha.javaxform.kitsune.KitsuneLoader"/>
        <table name="DROOLS_OUTPUT" type="output"
class="com.merced.agatha.javaxform.kitsune.KitsunePersister"/>
    <rules file="rules/Sample.drl"/>
    <parameter name="input.table"
value="RECORD_INPUT"/>
    <parameter name="output.table"
value="RECORD_OUTPUT"/>
    <parameter name="output.column.0"
value="key"/>
    <parameter name="output.column.1"
value="summary"/>
    <parameter name="output.column.2"
value="detail"/>
    </drools>
</msequence>
```

Note that in the definition, the loader and persister references are dynamic. The output.column.x parameters define which of the input columns should be included in the output table (e.g., key, summary, and detail). Given the output.column definitions above, the dynamically generated output table will look as follows:

TABLE 4

| ColName | DataType |
| --- | --- |
| Record Output Table RECORD_OUTPUT | |
| Key | VARCHAR2(255) |
| Summary | VARCHAR2(255) |
| detail | VARCHAR2(255) |

The rules file also include the data layer mapping to dynamically convert the data from database records to first class object inputs, determine the output object fields and write out the relevant transformed data. As an example, consider an improved rules file for a device troubleshooting rule for a call reasoning application of a call center. In this example, the rules file also includes a rule for device troubleshooting fitting the same condition as the earlier example. However, this example takes full advantage of the dynamic object layer to construct an input object at runtime:

```
package callReasonRules;
@@@GeneratedFactsImport@@
import com.merced.agatha.javaxform.drools.DroolsTransform;
function void setAndPersistFact(String key, String summary, String detail) {
    RECORD_INPUT record=new RECORD_INPUT( );
    record.setKey(key);
    record.setSummary(summary);
    record.setDetail(detail);
    DroolsTransform.persist(record);
}
rule "rule_1"
    when
        $record: RECORD_INPUT(
            reason1=="Troubleshooting"
            && reason2=="Device"
            && notesText not matches ".*broken.*")
        )
    then
        setAndPersistFact($record.getKey( ) "Device",
    "Device Troubleshooting");
        retract($record);
    end
```

Note that the input object is no longer imported. It is instead constructed at runtime and the name (in this case, RECORD_INPUT) is going to dynamically match the name of the input object itself. For the output, the input object definition is reused but only sets the values relevant to the output stream (key, summary, detail). Leaving the other variables NULL cuts down on wasted memory and input/output. When the objects are persisted to the database, the output table is intelligently constructed to include only those columns referenced in the original output definition (output.column.x notation), resulting in an output table that looks like this:

| ColName | Data Type |
| --- | --- |
| RECORD_OUTPUT | |
| Key | VARCHAR2(255) |
| Summary | VARCHAR2(255) |
| detail | VARCHAR2(255) |

In one implementation Java Reflection features are used to dynamically load and persist object instances. Java Reflection is a built-in feature that allows dynamic inspection of a class and its methods at runtime. Using reflection, its possible to look up a method by name and invoke it in order to store or retrieve information from object instances, including cases the underlying type of the object is not known. Using reflection, runtime instances can be created of a dynamically constructed class and each object instance's fields can be set to contain data that corresponds to individual records of the database table. After the business rules have been applied, an XML description's list of columns can be utilized to persist and retrieve the relevant values from the object instances for the final push to the database.

Referring back to FIG. 2, the rules engines 200 may be implemented on an individual computer or computer system, such as on a server 210 having a processor 212 and memory 214. Moreover, the server may be part of a Business Rule Management System (BRMS) and the rules engine may also be implemented as computer code stored on a non-transitory computer readable medium, such as a compute memory.

An exemplary application of the present invention is in a call center to perform call reasoning. In a call reasoning application there is often a shifting set of business rules. Moreover, in a call reasoning application the input/output requirements may frequently change. The rules engine of the present invention supports integrating input/output requirement changes without the need for technical expertise or changes to compiled code required in the prior art. However, it will be understood that the present invention has broad applicability in a broad variety of applications using a business rules engine besides call reasoning. In a call center environment the rules engine could also be used to alert agents to promotions or mistakes in the call. Quota management and territory management could be supported by the rules engine. The performance of agents in the financial world is another potential application. Text-mining is another rules engine application. The business rules engine application may include predictive modeling.

Another application of the present invention in a business rule engine is for agile data enrichment applications such as: 1) runtime data cleansing and validation in which there is a set of data content checks to rapidly flag bad content; 2) dynamic data aggregation, such as taking a set of records, turning the records into a numeric value, and then determining a business user-friendly label to put on top of it to make it available in reports; and 3) conditional data filter management in which there are rapidly evolving rules to apply filters to a dataset and exclude records that match or fail to match selected criteria.

As previously discussed, the present invention greatly reduces development resources and permits business consultants and analysts to work with a rules engine using any database table they wish without requiring a developer to write custom code. As an example of the development savings, in the prior art when a consultant needed to address a new set of facts they would typically require the developer to write code to load the facts from a table into a new object because the database table cannot be loaded directly into the rules engine. But in the prior art writing this code is time consuming, error prone, and an ongoing maintenance cost. Additionally, to produce the final output, the code must be written appropriate to the rules transformation. For example, consider the following Java object that would have to be produced in the prior art, which is a Java bean, manually defined:

```
public class RECORD_INPUT {
    public String key;
    public String reason1;
    public String reason2;
```

```
public String notesText;
public RECORD_INPUT( ){
}
public String getKey( ){
return key;
}
public void setKey(String key) {
this.key=key;
}
public String getReason1( ){
return reason1;
}
public void setReason1(String reason1) {
this.reason1=reason1;
}
public String getReason2( ){
return reason2;
}
public void setReason2(String reason2) {
this.reason2=reason2;
}
public String getNotesText( ){
return notesText;
}
public void setNotesText(String notesText) {
this.notesText=notesText;
}
}
```

In this example manually writing the custom code is only part of the additional development cost required in the prior art. However, a Java developer would also write error-prone code associated with marshalling records from the database and creating instances of the object, then create reciprocal code to serialize the object back to the database after the rules transformation. As can be seen from this example, the present invention saves time, money, and development resources.

It will be understood the present invention may be implemented as a method, apparatus, and system. Moreover, any of the method of the present invention may be implemented as computer program code stored on a non-transitory computer readable medium. Thus, in accordance with the present invention, the components, process steps, and/or data structures may be implemented using various types of operating systems, programming languages, computing platforms, computer programs, and/or general purpose machines. The present invention may also be tangibly embodied as a set of computer instructions stored on a computer readable medium, such as a memory device.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of integrating input or output requirement changes in a business rules engine comprising:
   in a business rules engine, utilizing a dynamic object layer supporting dynamically addressable facts as a layer of abstraction to directly load database tables into the business rules engine, for business users to integrate data model changes associated with input/output requirement changes without the need for changes to compiled code in the business rules engine associated with input/output requirements;
   the dynamic object layer generating a data layer mapping to convert data from database records into input record objects with an input table, wherein the input table includes both input column definitions and output column definitions to be included in an output table, wherein the output table is determined by applying a business rule by the business rules engine and includes only output column definitions that are included in the input table;
   the business rules engine: dynamically transforming input data from database records;
   determining output object fields; and
   writing out transformed data.

2. The method of claim 1, wherein the input table includes facts as rows and fact attributes as columns wherein definitions of output table attributes are included in columns of the input table.

3. The method of claim 2, wherein the output columns within the input table are placeholders.

4. The method of claim 1, wherein the output table defines aspects of: a dynamic output object, mapping of output object fields and the writing out of transformed data.

5. The method of claim 1, wherein dynamic persister and loader classes define attributes to determine which of the input columns are included in the output table.

6. The method of claim 1, wherein the business rules engine is operable to provision new resources by having the input table containing both the input and the output column definitions to dynamically obtain output variable names, definitions to define aspects of a dynamic output object, and a data layer mapping of output object fields and the writing out of transformed data.

7. A computer system, comprising:
   A server including at least one processor and a memory, the server including:
   a business rules engine requiring reduced development resources, comprising:
   a business rules file having at least one business rule;
   the business rules file utilizing dynamic objects to support dynamically addressable facts, including:
   an input table including facts and fact attributes, the input table further including includes both input column definitions and output column definitions of attributes of to be included in an output table for dynamically obtaining output variable names, wherein the output table is determined by applying a business rule by the business rules engine and the output table includes only output column definitions that are included in the input table;
   a rule block defining attributes of the input table to be included in a dynamic output object; and
   a data mapping layer converting data from database records to input record objects first class object fields, and dynamically converting data from database records to generate an input object at runtime; wherein the business rules engine is configured to support dynamically addressable facts such that the business rules engine is adaptable to load a new set of facts associated with a data model change into the rules engine without requiring the writing of new code to load the facts from a table into a new object.

8. The computer system of claim 7, wherein the input table includes facts as rows and fact attributes as columns wherein definitions of output table attributes are included in columns of the input table.

9. The computer system of claim 8, wherein the output columns within the input table are placeholders.

10. The computer system of claim 7, wherein the output table includes aspects of: the dynamic output object, mapping of output object fields and the writing out of transformed data.

11. The computer system of claim 7, wherein dynamic persister and loader classes define which input columns are included in the output table.

12. The computer system of claim 7, wherein the business rules engine is operable to provision new resources by having the input table containing both the input and the output column definitions to dynamically obtain output variable names, definitions to define aspects of the dynamic output object, and a data layer mapping of output object fields and the writing out of transformed data.

* * * * *